(12) United States Patent
Kulkarni et al.

(10) Patent No.: US 11,863,081 B2
(45) Date of Patent: Jan. 2, 2024

(54) INTEGRATED VOLTAGE REGULATOR WITH INTEGRATED AIR-CORE INDUCTOR

(71) Applicant: Dialog Semiconductor (UK) Limited, London (GB)

(72) Inventors: Santosh Kulkarni, Swindon (GB); Jens Masuch, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 1084 days.

(21) Appl. No.: 16/669,909

(22) Filed: Oct. 31, 2019

(65) Prior Publication Data
US 2021/0135587 A1    May 6, 2021

(51) Int. Cl.
H01F 27/28   (2006.01)
H02M 5/293   (2006.01)
H01F 3/14   (2006.01)

(52) U.S. Cl.
CPC .............. H02M 5/293 (2013.01); H01F 3/14 (2013.01); H01F 27/2804 (2013.01)

(58) Field of Classification Search
CPC ......... H01F 27/2804; H01F 2027/2809; H01F 17/0013; H01F 17/0006; H01F 5/003; H01F 3/14; H02M 5/293
USPC .................................................. 336/200, 232
See application file for complete search history.

(56) References Cited

U.S. PATENT DOCUMENTS

| | | | |
|---|---|---|---|
| 6,396,137 B1 | 5/2002 | Klughart | |
| 9,349,692 B2 | 5/2016 | Pan et al. | |
| 9,406,738 B2 | 8/2016 | Kireev et al. | |
| 9,853,003 B1 | 12/2017 | Han et al. | |
| 2007/0206363 A1 | 9/2007 | Cespedes et al. | |
| 2014/0068932 A1 | 3/2014 | Sturcken | |
| 2017/0221819 A1* | 8/2017 | Chu | H01L 21/4853 |
| 2018/0025999 A1* | 1/2018 | Yu | H01L 23/485 257/428 |
| 2018/0138126 A1* | 5/2018 | Chen | H01L 23/50 |
| 2018/0190635 A1 | 7/2018 | Choi et al. | |
| 2020/0295121 A1* | 9/2020 | Liao | H01L 21/486 |

OTHER PUBLICATIONS

FerricSemi.com, "Integrated Power Management with Ferromagnetic Thin-Film Power Inductors," by Noah Strucken, Oct. 18, 2018, 15 pgs.
German Office Action, File No. 10 2020 200 544.3, Applicant: Dialog Semiconductor (UK) Limited, dated Dec. 15, 2020, 9 pages.

* cited by examiner

*Primary Examiner* — Tszfung J Chan
(74) *Attorney, Agent, or Firm* — Saile Ackerman LLC; Stephen B. Ackerman

(57) ABSTRACT

A single/Multi-phase PMIC built on silicon substrate with coil layers processed on top of the PMIC layers' is provided. The integrated coil is in a spiral form, with a gap at the center of the coil, making additional metal routing not required. The integrated coil has connection pads located in the center gap of the spiral form, limiting the overall inductor resistance to the device only. The on-die inductor may have a magnetic core wrapping the windings. The spiral form may be implemented in a circular design, or a racetrack (elongated spiral) design. The coil layers may be implemented as multiple coil layers or as a single coil layer, connected in parallel (with the same I/O pads), reducing the resistance and maintaining the inductance.

18 Claims, 11 Drawing Sheets

INTEGRATED VOLTAGE REGULATOR WITH INTEGRATED AIR-CORE INDUCTOR

FIELD

The present disclosure relates generally to a Power Management Integrated Circuit (PMIC) with discrete inductor coils. More particularly, the present invention relates to a discrete/integrated inductor within an embedded PMIC, or a PMIC with an embedded discrete/integrated inductor.

BACKGROUND

Almost all PMIC's, including switching converters such as buck, boost, and buck/boost converters, require an inductor. Presently, there are three different approaches to designing integrated inductors on silicon within a PMIC: planar air coils (spiral, racetrack), magnetic core sandwiched between coil layers (Solenoid), and magnetic core wrapping coil layer in between (Stripline). The solenoid and stripline both have the connection pads ending on opposite ends of the device, which requires additional routing metal to connect the device with the remainder of the circuit. This additional metal path adds to the resistance and lowers the quality factor (Q-factor) of the device, resulting in lower efficiency. Comparing the solenoid design with the spiral air coils, the additional routing layer for connecting the solenoid inductor adds about 10 mΩ in dc resistance, which is about 30-50% (depending on the design) of the inductor resistance. The requirement of additional routing metal is required for the stripline design also, as the pads for the inductor end on opposite ends of the device, and there is no gap in the center of the device.

SUMMARY

Accordingly, it is an object of one or more embodiments of the present disclosure to optimize the implementation of a multi-phase Integrated voltage regulator, with die passives having minimum interconnect parasitics, and lower conducted Electromagnetic Interference (EMI).

It is a further object of one or more embodiments of the disclosure to provide an integrated inductor, where the on-die coil is in a spiral form, with a gap at the center of the coil, making additional metal routing not required.

Still further, it is an object of one or more embodiments of the disclosure to provide an integrated inductor, where the connection pads are located in the center gap of a spiral inductor, limiting the overall inductor resistance to the device only.

Other objects will appear hereinafter.

The above and other objects of the present disclosure may be accomplished in the following manner. A Single/Multi-phase integrated voltage regulator, with an Integrated Air-Core Inductor, comprises an integrated voltage regulator, on a silicon substrate, and an integrated air-core inductor on top of the integrated voltage regulator. The integrated air-core inductor comprises a spiral shape, and a gap at a center of the spiral shape. The integrated voltage regulator has at least one supply connection pad in the gap at the center of the spiral design of the integrated air-core inductor.

The above and other objects of the present disclosure may be further accomplished with a method for constructing an Integrated Voltage Regulator, with an Integrated Air-Core Inductor. The steps include forming an integrated voltage regulator, in and on a silicon substrate. The steps include forming an integrated air-core inductor, over the integrated voltage regulator, where the air-core inductor has a spiral shape and gap at a center of the spiral shape. The steps also include forming at least one supply connection pad of the integrated voltage regulator in the gap.

In various embodiments the on-die inductor may have a magnetic core wrapping the windings.

In various embodiments the spiral coil may be implemented in a circular design, or a racetrack (elongated spiral) design.

In various embodiments the coil layers may be implemented as multiple coil layers or a single coil layer, connected in parallel with the same supply connection pads, reducing the resistance and maintaining the inductance.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

The present disclosure proposes a Single/Multi-phase Power Management Integrated Circuit (PMIC) built on a silicon substrate, with coil layers processed on top of the Integrated Circuit (IC) metal layers. Each phase of the Multi-phase PMIC comprises a single output inductor. At least one of the power supply connection pads (Vss or Vdd) is placed in the center gap of the coil layers, to minimize parasitics, where the coil layers are created by electroplating thick copper/silver in a spiral resist template, formed by lithography.

The key elements of the disclosure include an even number of spiral inductors (air and magnetic core based) each having a gap at its center. Using an even number of coils enables far field cancellation, resulting in lower electromagnetic interference (EMI). Further, layout of the inductors is such that they are all placed in a row in sets of two. The inductors in each set must have negative coupling, where two adjacent sets have positive coupling, to reduce EMI.

Figure 1:
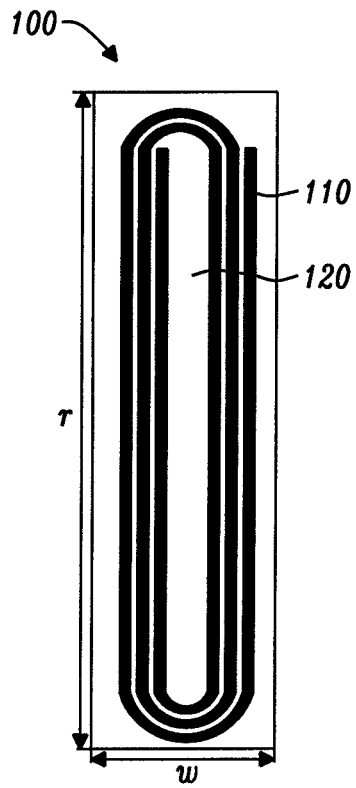
FIG. 1 shows a spiral inductor implemented in a racetrack (elongated spiral) design.
Figure 2:
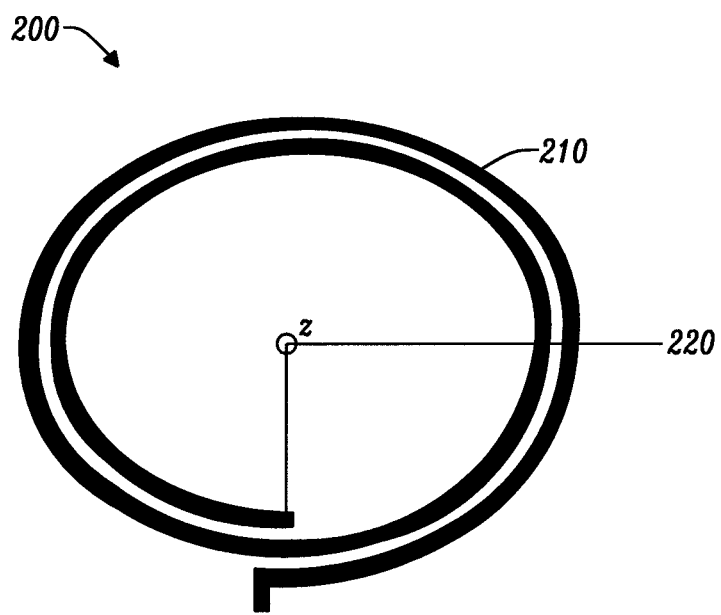
FIG. 2 shows a spiral inductor implemented in a circular spiral design.

The spiral inductors can be implemented as a racetrack (elongated spiral) design in FIG. 1 100, or a circular spiral design in FIG. 2 200. FIG. 1 element 110 illustrates the elongated spiral inductor, and 120 the gap at the center of the elongated spiral inductor. FIG. 2 element 210 illustrates the circular spiral inductor, and 220 the gap at the center of the circular spiral inductor.

The coil layers of the disclosure are above the PMIC formed in and on the silicon substrate, and the supply interconnection pads (for Vss or Vdd) are placed in the center gap of the spiral inductor coils. With this construction, the parasitic interconnections between the spiral coil and supply pads for Vss or Vdd are minimized, resulting in lower losses and improved efficiency. Additionally, the gap at the center of the spiral coil reduces the path length for the flux to travel, hence increasing the inductance, and creating higher quality factor (Q-factor) for the device (in terms of inductance/DC resistance).

Figure 3:
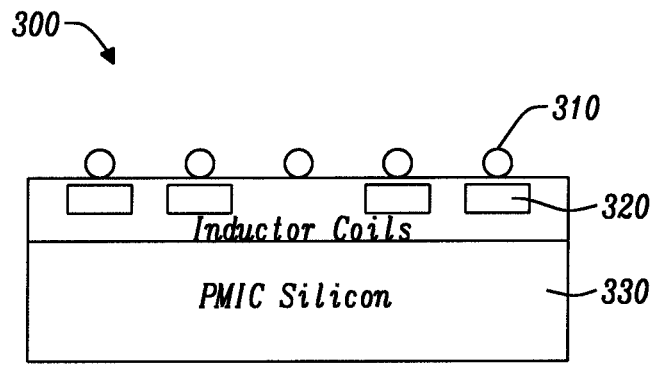
FIG. 3 shows a schematic of a single or multi-phase interactive integrated voltage regulator (IVR) circuit, constructed with spiral inductor coils, built on top of PMIC silicon.

FIG. 3 shows 300, a schematic of a single or a multi-phase integrated voltage regulator (IVR) circuit, constructed with spiral inductor coils 320, built on top of PMIC silicon 330. The improved arrangement of the coils, with interconnect pads 310 at the center of the inductor coils, can reduce the parasitic resistance by up to 30-50% of the coil resistance, compared to other implementations of the inductor coil, built on top of PMIC silicon, without a gap at the center of the inductor coil.

Figure 4:
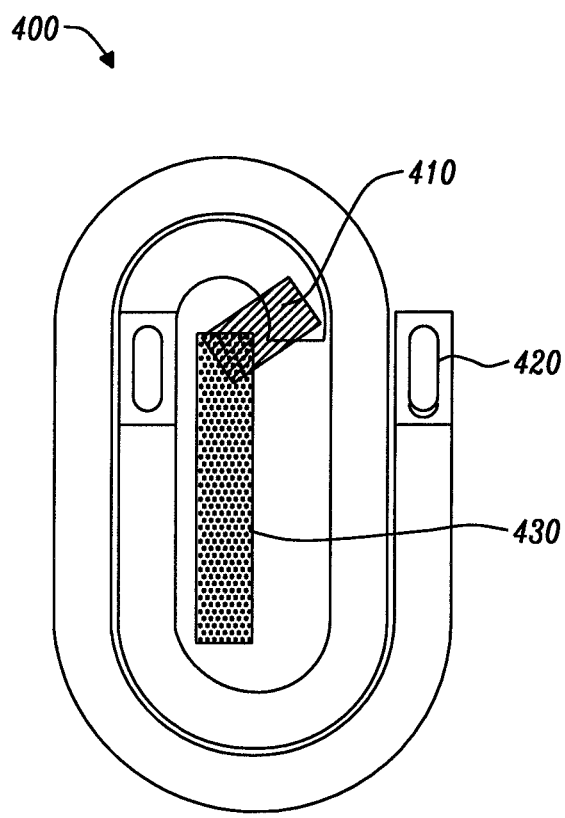
FIG. 4 shows the pad arrangement at the center of an spiral inductor coil, embodying the principles of the disclosure.

FIG. 4 shows 400, the pad arrangement at the center of an spiral inductor coil 420. The primary reason for the reduction in parasitic resistance in the disclosure is the possibility of connecting the supply rails 430 to the inside pad 410 of the inductor, with the shortest possible interconnect. In most inductor designs, the inductor pads are either on opposite sides (Solenoid or Stripline) or on the same side (Toroid or spiral), which means connections to supply pads need a longer interconnect path, thereby leading to a higher resistance. Additionally, for these designs, the presence of a magnetic core can potentially make it impossible to have a gap at the center of the device, which can minimize the interconnect path.

In a comparison between a solenoid (magnetic core based) inductor and an air coil spiral inductor, both built on silicon, experimental results confirm a 5-10 mΩ additional interconnect resistance is needed for the case of the solenoid inductor connected to its supply pads. This is a significant issue, as the inductor resistance on it's own is 20 mΩ, and with the additional supply track, the total inductor resistance increases to 25-30 mΩ, or 30-50% of overall inductor resistance.

The additional 5-10 mΩ resistance is not present in the air coil spiral inductor, as the pads can be placed in the center of the coil. Further, the additional supply track resistance will impact the overall Q-factor (in terms of AC loss performance merit) of the device at higher frequencies. The Q-factor of the inductor is given as 2*π*Freq*Inductance/AC Resistance, where the additional interconnect path contributes to the overall AC resistance of the device, resulting in lower Q-factor of the device with reduced efficiency.

Figure 5A:
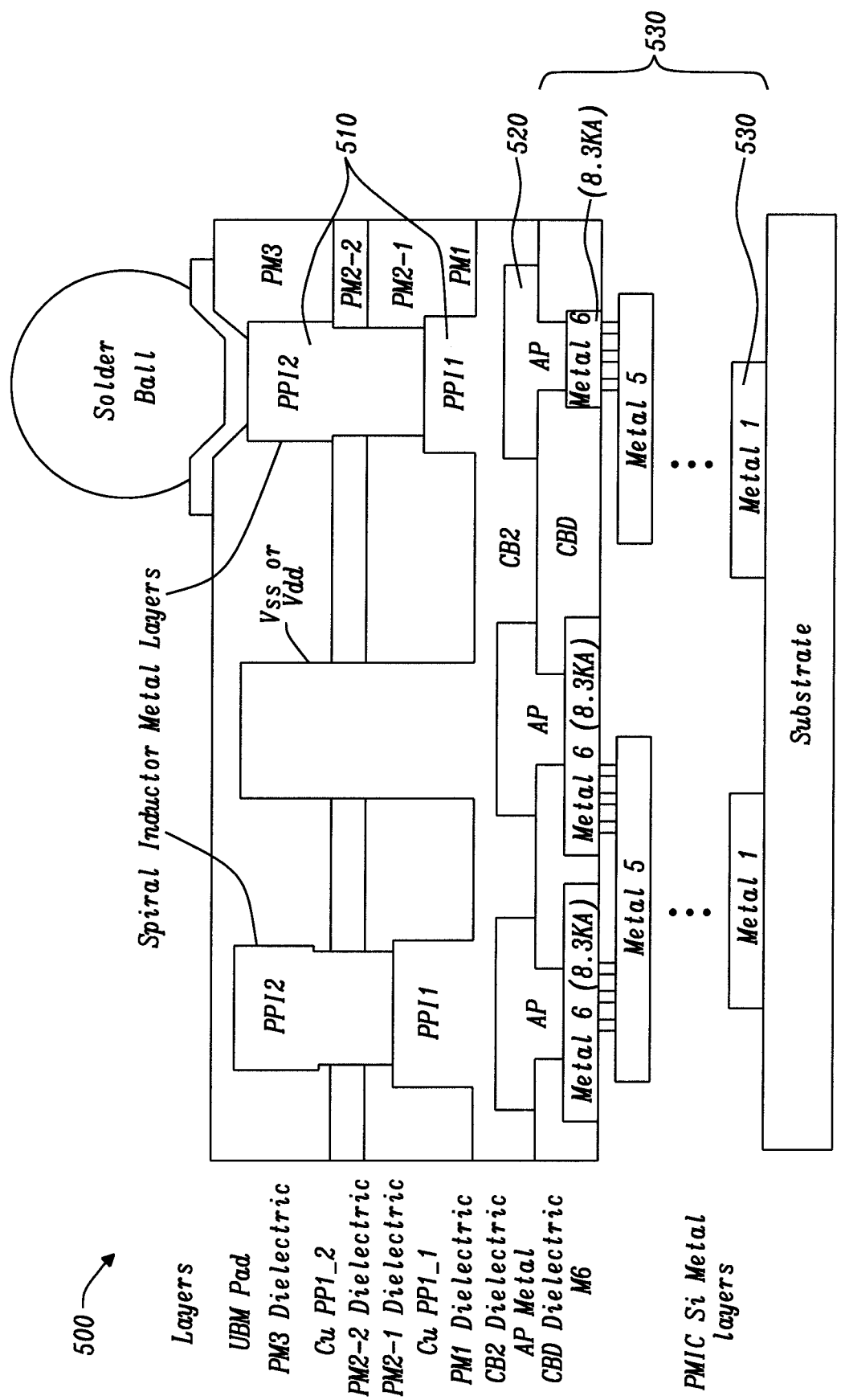
FIG. 5A shows a cross-section of an integrated voltage regulator (IVR) circuit, with a Power Management Integrated Circuit (PMIC) and metal layers 1-6 (though other metal layer counts could also be used), with inductor metal layers (with air coils) built over the PMIC.

FIG. 5A shows 500, a cross-section of an integrated voltage regulator (IVR) circuit, with a Power Management Integrated Circuit (PMIC) and metal layers 1-6 (though other metal layer counts could also be used), with inductor metal layers (with air coils) built over the PMIC. It shows the complete cross-section of a typical PMIC in and on a silicon substrate, with an integrated coil processed on top of the IC metal layers. The 530 Metal layers are PMIC layers, and the 520 AP layer is the interconnection/rerouting layer to the inductor and capacitor from the PMIC. Finally, the 510 metal layers (PPI1, PPI2) on top represent the inductor layers, which in this case are a two-level spiral inductor, with a gap at the center for the supply pads. Note the inductor can be formed by a single metal layer as well.

Figure 5B:
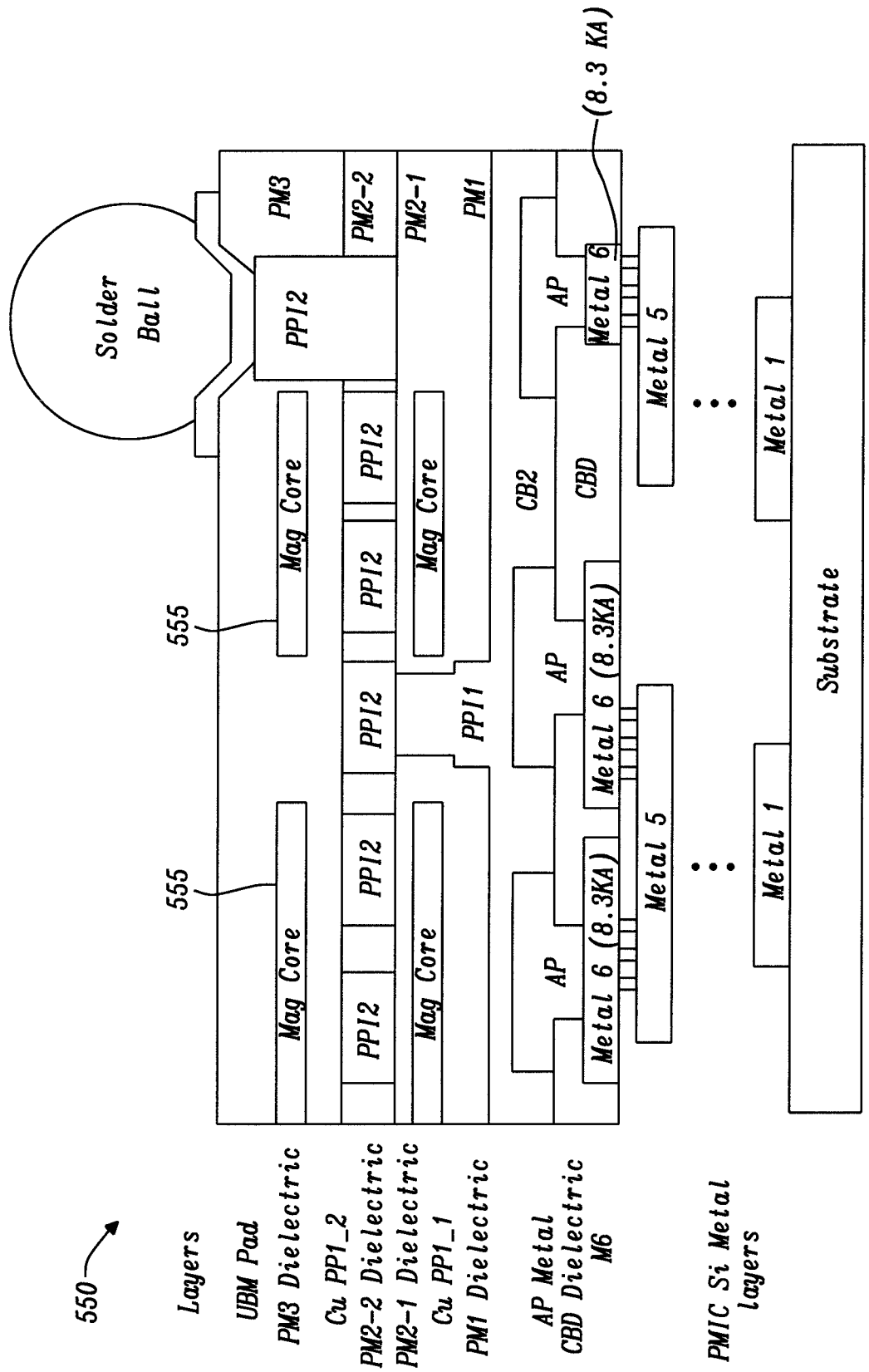
FIG. 5B shows how a magnetic core wrapping the windings is formed.

FIG. 5B shows 550, how a magnetic core wrapping the windings is formed. The fabrication of the inductor takes place after the completion of all the metal layers required in the PMIC and is described below.

Figure 5C:
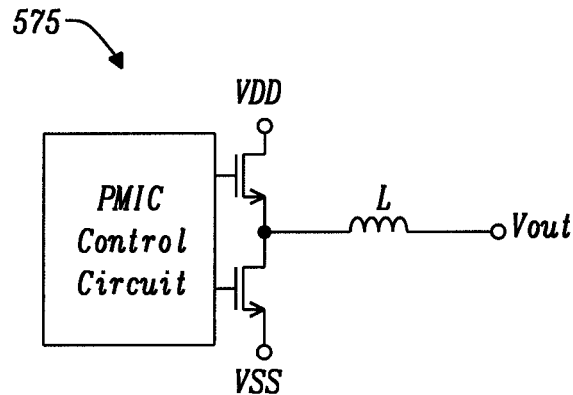
FIG. 5C shows a circuit drawing showing a typical PMIC for a buck configuration connected to an inductor, the inductor output, and VSS/VDD connections.
Figure 5D:
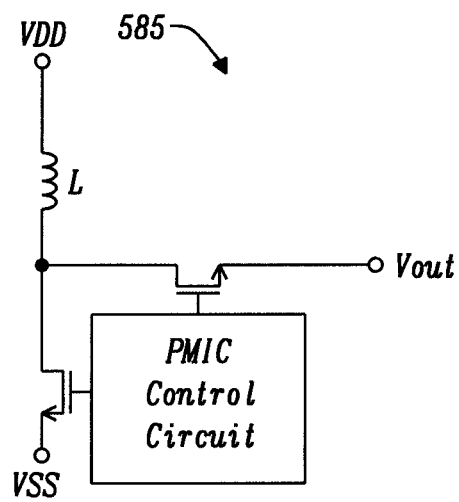
FIG. 5D shows a circuit drawing showing a typical PMIC for a boost configuration connected to an inductor, the inductor output, and VSS/VDD connections.

FIGS. 5C and 5D show a circuit drawing showing a typical PMIC connected to an inductor, the inductor output, and VSS/VDD connections. The inductor and power switches of a buck configuration 575 in FIG. 5C, and a boost configuration 585 in FIG. 5D, are shown. For conventional switch-mode power supplies (SMPS), the power switches and control circuit are integrated within the PMIC. For the present invention, an air-core inductor L is integrated within the PMIC as well.

Figure 6:
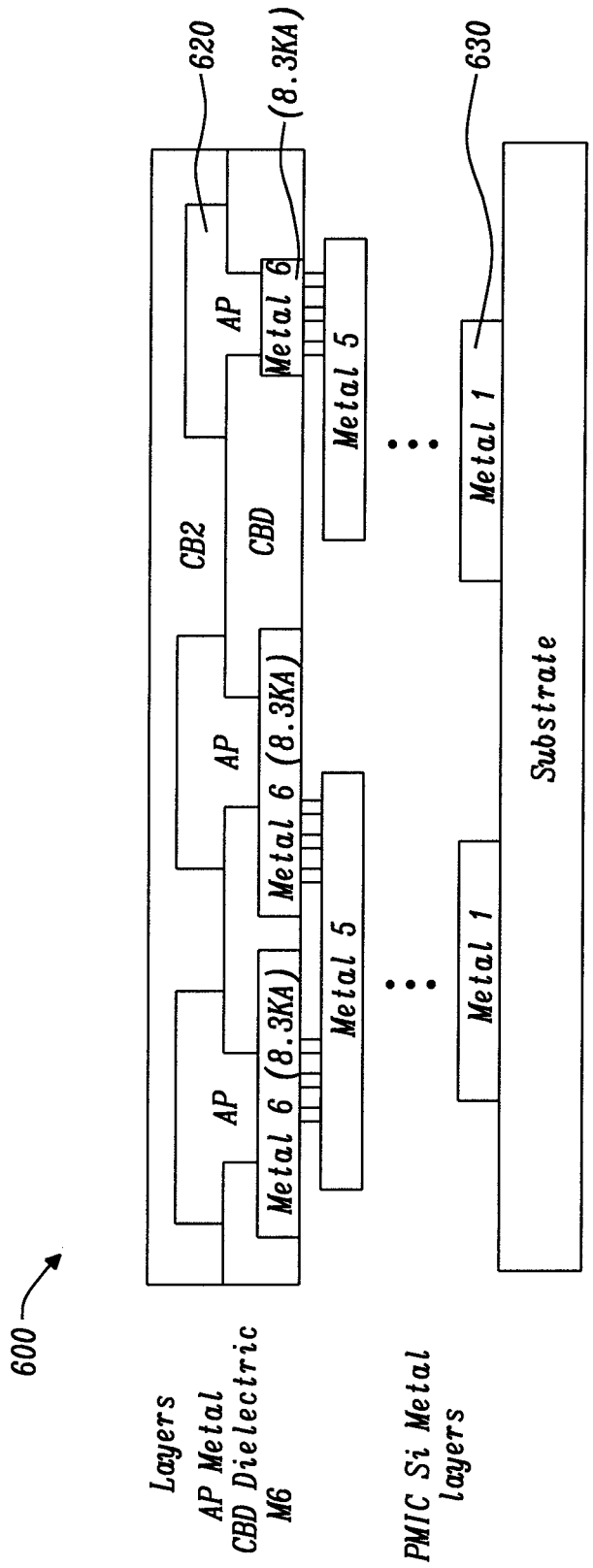
FIG. 6 shows Step 1 after formation of the PMIC, and prior to the fabrication process of the inductor layers.

FIG. 6 shows 600, Step 1 after formation of the PMIC, and prior to the fabrication process of the inductor layers, where 520 is the AP layer for interconnecting/rerouting to the inductor and capacitor from the PMIC, and 530 is the PMIC metal layers. This step is for integrating the spiral inductor coil, by depositing a metal interconnection or rerouting AP layer, which connects the PMIC to passive elements, such as the inductors and capacitors.

Figure 7:
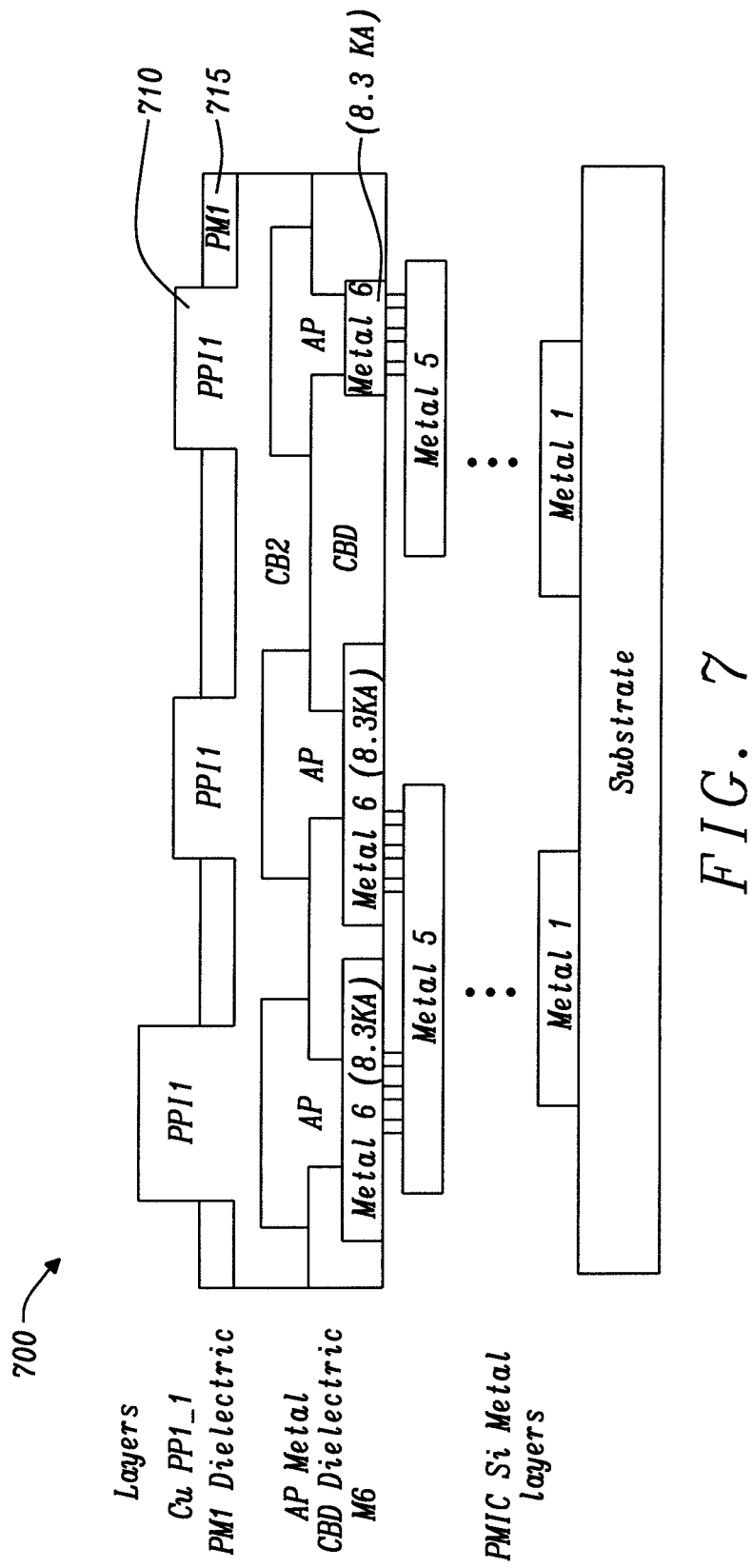
FIG. 7 shows Step 2, for depositing and patterning Copper (or other metals such as Silver PPI1), and the PM1 dielectric layer, in the fabrication process of the inductor layers.

FIG. 7 shows 700, Step 2 for depositing and patterning Copper (or other metals such as Silver PPI1) layers 710, and the dielectric layer (PM1) 715, in the fabrication process of the inductor layers. Following the deposition of the AP layer in Step 1, Step 2 is used to deposit the first metal layer of the inductor (PPI1) and the supply pads.

Figure 8:
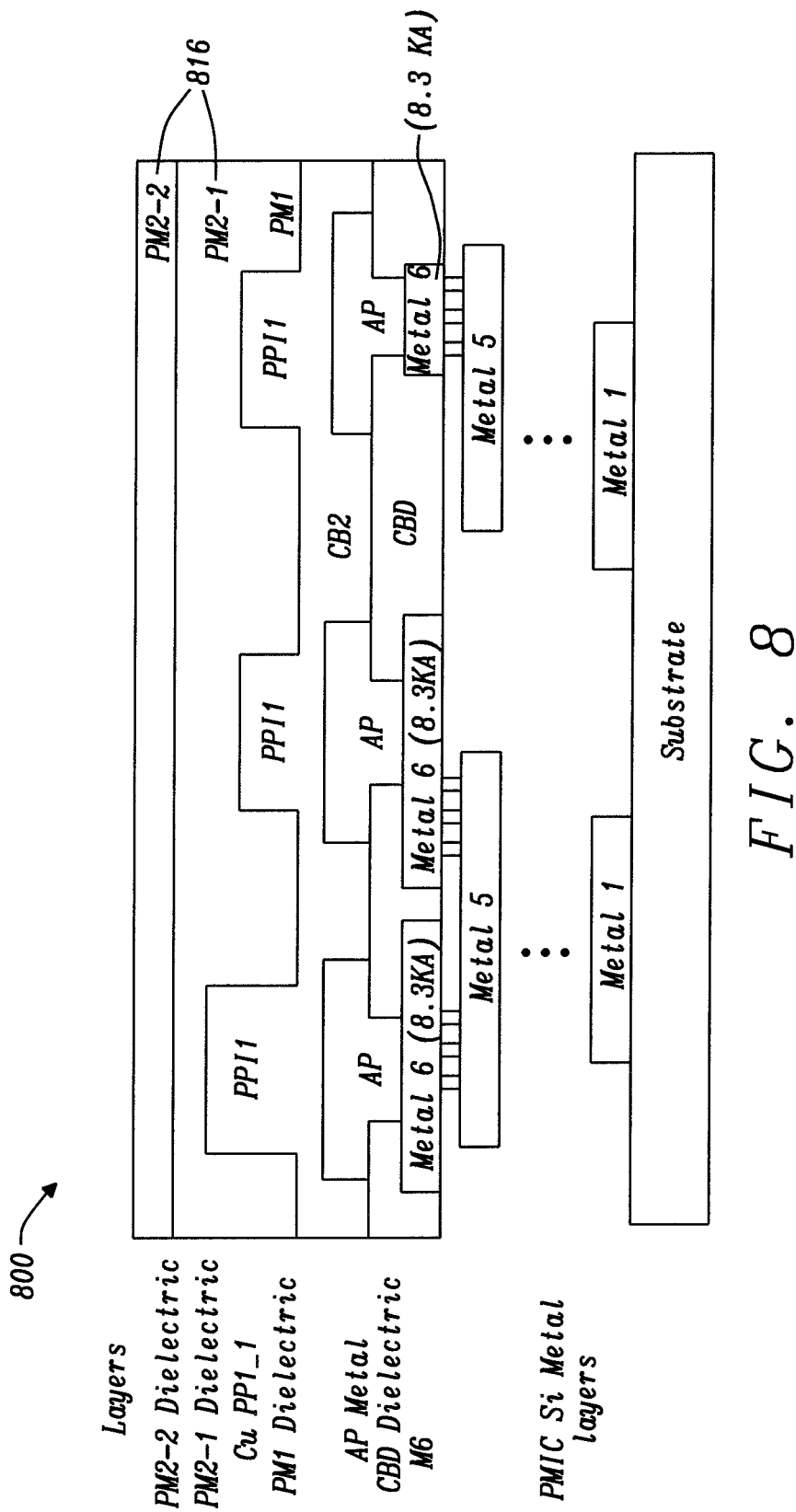
FIG. 8 shows Step 3, for depositing dielectric layers PM2-1, PM2-2, in the fabrication process of the inductor layers.

FIG. 8 shows 800, Step 3 for depositing dielectric layers PM2-1, PM2-2 816, in the fabrication process of the inductor layers. Step 3 is used to deposit the non-conducting dielectric layers PM2-1, PM2-2, and to isolate the first inductor metal layer PPI1, and then form openings for the inductor I/O pads and supply pads.

Figure 9:
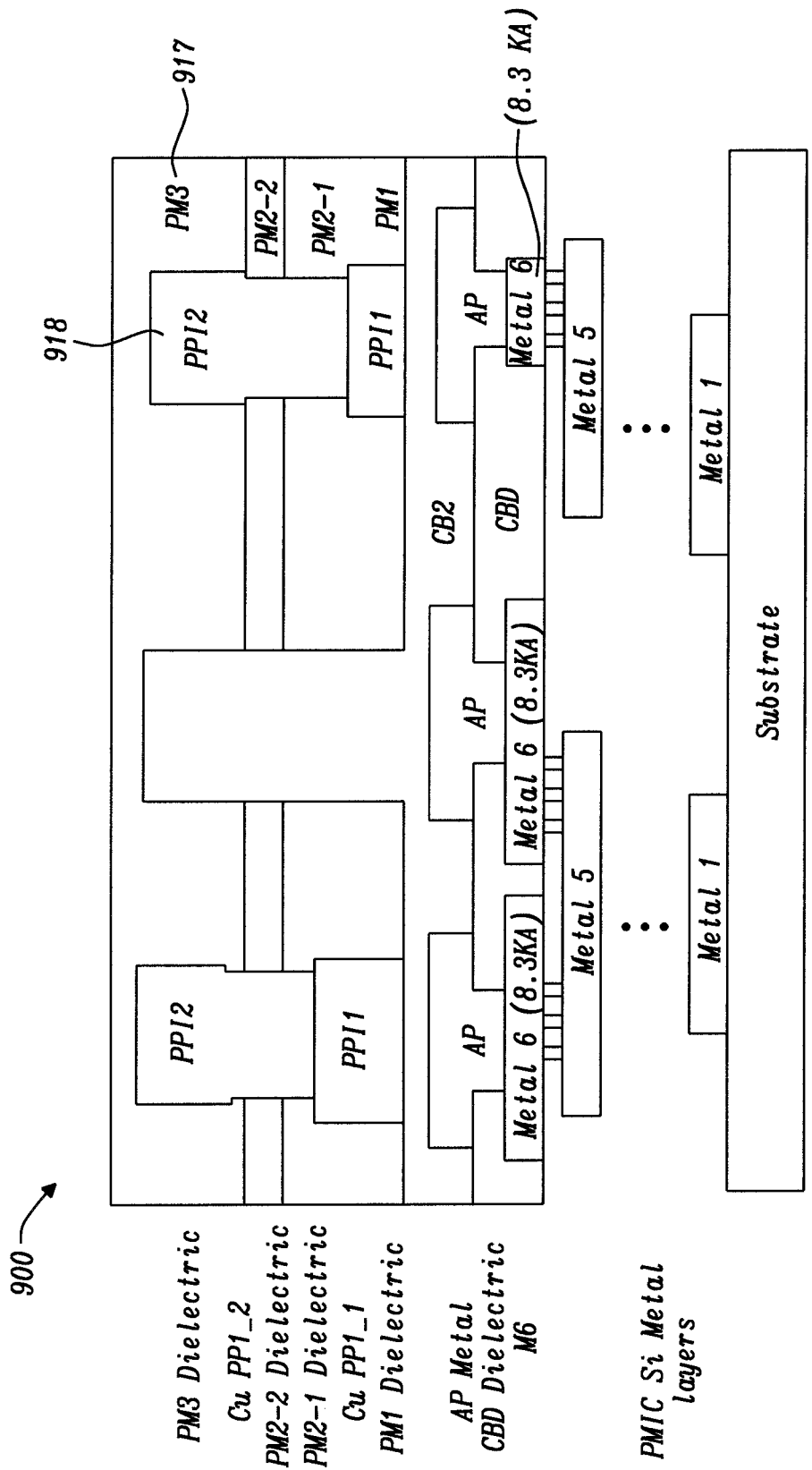
FIG. 9 shows Step 4 for depositing Copper (or other metal PPI2) layers, and the PM3 dielectric layer, in the fabrication process of the inductor layers.

FIG. 9 shows 900, Step 4 for depositing Copper (or other metal PPI2) layers 918 and the dielectric layer (PM3) 917, in the fabrication process of the inductor layers. Step 4 is used to deposit the second metal layer PPI2 of the inductor and supply pads, along with filling in the metal vias which connect the two metal layers PP1 and PP2. The top metal layer is isolated, using a second dielectric layer PM3.

Figure 10:
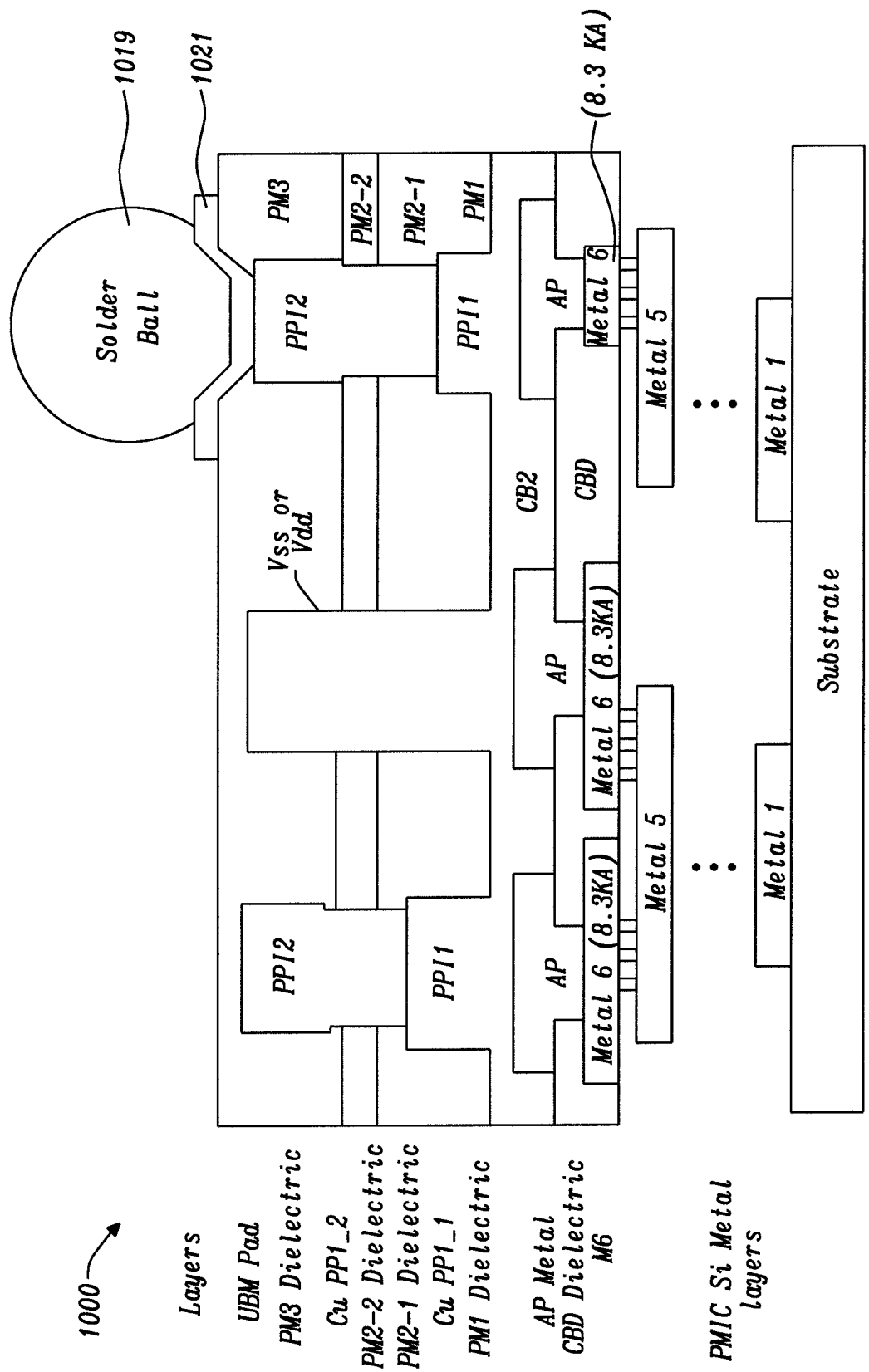
FIG. 10 shows Step 5 for depositing the Under Bump Metallurgy (UBM) and solder ball, in the fabrication process of the inductor layers.

FIG. 10 shows 1000, Step 5 for depositing the Under Bump Metallurgy (UBM) 1021 and solder ball 1019, in the fabrication process of the inductor layers. Step 5 is the final step used to deposit the metallization on the I/O pads of the entire structure and bump the pads with solder balls.

Figure 11:
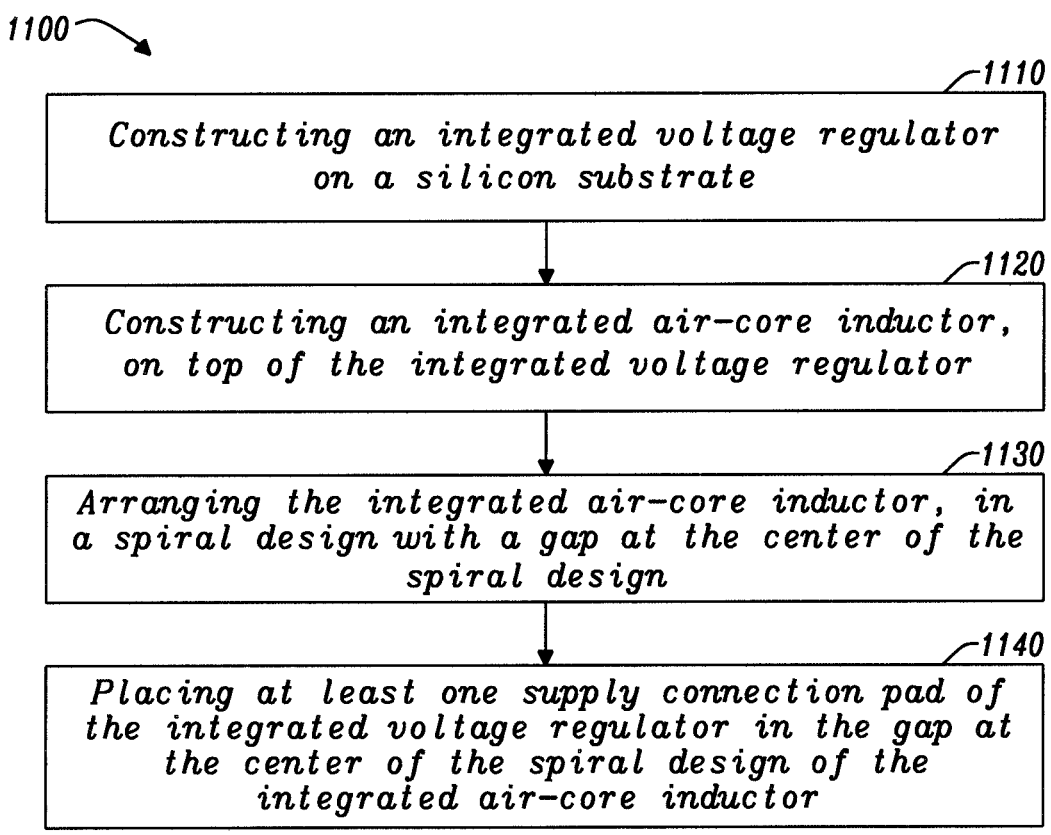
FIG. 11 is a flow chart of a method for constructing an Integrated Voltage Regulator, with an Integrated Air-Core Inductor.

FIG. 11 is flow chart 1100, of a method for constructing an Integrated Voltage Regulator, with an Integrated Air-Core Inductor. The steps include 1110, forming an integrated voltage regulator, in and on a silicon substrate. The steps include 1120, forming an integrated air-core inductor, over the integrated voltage regulator, where the air-core inductor has a spiral shape and gap at a center of the spiral shape. The steps also include 1130, forming at least one supply connection pad of the integrated voltage regulator in the gap.

The main advantage of one or more embodiments of the present disclosure include reduced interconnect parasitics and lower Electromagnetic Interference (EMI). The use of integrated air-core coils in the integrated voltage regulator allows the entire device to either be packaged or monolithically built with the application, that it powers, for example in a mobile processor. This enables significant reduction (if not elimination) of Power Distribution Network (PDN) circuitry, resulting in a smaller Bill of Materials (BOM) and overall improved efficiency.

While particular embodiments of the present disclosure have been illustrated and described, it will be understood by those skilled in the art that various changes in form and details may be made without departing from the spirit and scope of the invention.

What is claimed is:

1. A Single/Multi-phase integrated voltage regulator, with an Integrated Air-Core Inductor, comprising:
    an integrated voltage regulator, on a silicon substrate; and
    the integrated air-core inductor built on top of the integrated voltage regulator, wherein the integrated air-core inductor comprises:
        a spiral shape, and
        a gap at a center of the spiral shape; and
    wherein the integrated voltage regulator has at least one supply connection pad in the gap at the center of a spiral design of the integrated air-core inductor.

2. The Single/Multi-phase integrated voltage regulator of claim 1, wherein the integrated voltage regulator comprises a Power Management Integrated Circuit (PMIC).

3. The Single/Multi-phase integrated voltage regulator of claim 1, wherein each phase of the Single/Multi-phase integrated voltage regulator comprises a single air-core integrated inductor on each phase's output.

4. The Single/Multi-phase integrated voltage regulator of claim 1, wherein the integrated air-core inductor comprises a circular or a racetrack shape.

5. The Single/Multi-phase integrated voltage regulator of claim 1, wherein the supply connection pad in the gap at the center of a spiral arrangement of the integrated air-core inductor is connected to minimize an interconnect path.

6. The Single/Multi-phase integrated voltage regulator of claim 1, wherein the integrated air-core inductor comprises multiple metal layers, connected in parallel with supply connection pads.

7. The Single/Multi-phase integrated voltage regulator of claim 1, wherein the integrated air-core inductor comprises a single metal layer, connected in parallel with supply connection pads.

8. The Single/Multi-phase integrated voltage regulator of claim 1, wherein the integrated air-core inductor further comprises a magnetic core wrapping around windings of the integrated air-core inductor.

9. The Single/Multi-phase integrated voltage regulator of claim 1, further comprising a second integrated air-core inductor formed adjacent to a first integrated air-core inductor, to create a pair of adjacent coils, configured for EMI cancellation.

10. The Single/Multi-phase integrated voltage regulator of claim 9, further comprising one or more additional pairs of adjacent coils, to form even numbers of adjacent coils, to provide negative coupling, wherein two adjacent sets of said even numbers of said first and second integrated air-core inductors are configured to provide positive coupling.

11. A method for constructing a Single/Multi-phase integrated voltage regulator, with an Integrated Air-Core Inductor comprising:
    forming an integrated voltage regulator, in and on a silicon substrate;
    forming the integrated air-core inductor, built on top of the integrated voltage regulator, wherein the integrated air-core inductor has a spiral shape and gap at a center of the spiral shape; and
    forming at least one supply connection pad of the integrated voltage regulator in the gap.

12. The method of claim 11, wherein said forming the integrated air-core inductor comprises:
    depositing and patterning a first inductor metal layer, and a first dielectric layer;
    depositing second and third dielectric layers over said first dielectric layer;
    depositing and patterning a second inductor metal layer, and a fourth dielectric layer over said third dielectric layer; and
    forming an Under Bump Metallurgy (UBM) and solder ball, connected to the integrated air-core inductor.

13. The method of claim 12, wherein said first and second inductor metal layers comprise copper or silver.

14. The method of claim 11, wherein the integrated voltage regulator comprises a Power Management Integrated Circuit (PMIC).

15. The method of claim 11, wherein the spiral shape comprises a circular or a racetrack design.

16. The method of claim 11, further comprises forming a magnetic core around windings of the integrated air-core inductor.

17. The method of claim 11, further comprises configuring the integrated air-core inductor with an even number of coils, for EMI cancellation.

18. The method of claim 17, further comprises a layout placing the integrated air-core inductors in a row in sets of two, wherein the integrated air-core inductors in each set are configured for negative coupling, and two adjacent sets of the integrated air-core inductors are configured for positive coupling.

* * * * *